US012754912B2

(12) United States Patent
Chennuru et al.

(10) Patent No.: US 12,754,912 B2
(45) Date of Patent: Oct. 6, 2026

(54) SYSTEMS AND METHODS FOR DYNAMIC QUERY OPTIMIZATION FOR DISTRIBUTED COMPUTING ENVIRONMENTS

(71) Applicant: Elevance Health, Inc., Indianapolis, IN (US)

(72) Inventors: Ashok Chennuru, Powell, OH (US); Anil Loomba, Iselin, NJ (US); Pisharath Krishnan, Frisco, TX (US); Ian Gunn, Cranbrook (CA); Christopher Roper, Weston, CT (US); Bharath Srinivasaiah, Richmond, VA (US); Krishna Kanumuri, Atlanta, GA (US); Umamaheswara Reddy Kudumula, Atlanta, GA (US); Sangameswara Rao Gavini, Hyderabad (IN)

(73) Assignee: Elevance Health, Inc., Indianapolis, IN (US)

( * ) Notice: Subject to any disclaimer, the term of this patent is extended or adjusted under 35 U.S.C. 154(b) by 0 days.

(21) Appl. No.: 19/032,520

(22) Filed: Jan. 21, 2025

(65) Prior Publication Data

US 2026/0211882 A1 Jul. 23, 2026

(51) Int. Cl.
*G06F 16/00* (2019.01)
*G06F 9/50* (2006.01)
(Continued)

(52) U.S. Cl.
CPC ...... *G06F 16/24542* (2019.01); *G06F 9/5083* (2013.01); *G06F 11/3419* (2013.01);
(Continued)

(58) Field of Classification Search
CPC ............. G06F 16/24542; G06F 16/283; G06F 16/24539; G06F 16/24544; G06F 16/2453;
(Continued)

(56) References Cited

U.S. PATENT DOCUMENTS 8,332,388 B2 * 12/2012 Chaudhuri ........ G06F 16/24542 707/765
8,682,875 B2 * 3/2014 Barsness ............. G06F 16/2453 707/718
(Continued)

FOREIGN PATENT DOCUMENTS

WO WO 2008016878 A2 * 2/2008
WO WO 2012054860 A1 * 4/2012
WO 2022084784 A1 4/2022

OTHER PUBLICATIONS

Punit Goel et al., "Optimizing Modern Cloud Data Warehousing Solutions Techniques and Strategies", IJNRD | vol. 8, Issue Mar. 3, 2023 | ISSN: 2456-4184; pp. 772-783.*
(Continued)

*Primary Examiner* — Srirama Channavajjala
(74) *Attorney, Agent, or Firm* — Morgan, Lewis & Bockius LLP

(57) ABSTRACT

Systems and methods are provided for dynamically optimizing query execution in distributed computing environments. The method may begin by receiving and analyzing a query to determine complexity of the query, including generating an execution plan, assessing data volume, and identifying required operations. Based on this analysis, the system may estimate necessary computational resources. The system may then select an optimal execution environment by evaluating available resources and current workloads, or provision a new environment if needed. The system may then submit the query to the chosen environment,
(Continued)

monitor the query during execution, and/or record performance statistics. This adaptive approach ensures efficient resource allocation and query processing, potentially improving performance and reducing costs in large-scale data processing systems.

17 Claims, 4 Drawing Sheets

(51) Int. Cl.

| | |
|---|---|
| ***G06F 11/34*** | (2006.01) |
| ***G06F 16/2453*** | (2019.01) |
| ***G06F 16/2455*** | (2019.01) |
| ***G06F 16/2458*** | (2019.01) |
| ***G06F 16/28*** | (2019.01) |

(52) U.S. Cl.
CPC ...... *G06F 11/3466* (2013.01); *G06F 16/2453* (2019.01); *G06F 16/24544* (2019.01); *G06F 16/2455* (2019.01); *G06F 16/2471* (2019.01); *G06F 16/283* (2019.01)

(58) Field of Classification Search
CPC ............. G06F 16/2455; G06F 16/2471; G06F 9/5083; G06F 11/3466; G06F 11/3419
See application file for complete search history.

(56) References Cited

U.S. PATENT DOCUMENTS

| | | | | |
|---|---|---|---|---|
| 10,936,589 | B1 | 3/2021 | Beitchman et al. | |
| 11,144,550 | B2 * | 10/2021 | Chen | G06F 16/24537 |
| 11,341,133 | B2 * | 5/2022 | Sidoti | G06F 16/24542 |
| 12,210,526 | B1 * | 1/2025 | Cho | G06F 16/24539 |
| 2003/0088579 | A1 * | 5/2003 | Brown | G06F 16/284 |
| 2010/0145929 | A1 * | 6/2010 | Burger | G06F 16/24542 707/E17.017 |
| 2010/0153958 | A1 | 6/2010 | Richards et al. | |
| 2020/0311083 | A1 * | 10/2020 | Mayr | G06F 16/2246 |
| 2020/0349161 | A1 * | 11/2020 | Siddiqui | G06F 16/211 |
| 2020/0379806 | A1 | 12/2020 | Mann et al. | |
| 2022/0035812 | A1 * | 2/2022 | Balaraman | G06F 16/24535 |
| 2022/0188308 | A1 * | 6/2022 | Sun | G06N 20/00 |
| 2023/0153303 | A1 * | 5/2023 | Doshi | G06F 16/24542 707/718 |
| 2024/0394255 | A1 | 11/2024 | Potocnik et al. | |

OTHER PUBLICATIONS

C. Gupta et al., "PQR: Predicting Query Execution Times for Autonomous Workload Management", 2008 International Conference on Autonomic Computing (2008, pp. 13-22).*

International Search Report and Written Opinion for related International Application No. PCT/US2025/012305, dated Sep. 16, 2025, 13 pages.

Perron et al., "Starling: A Scalable Query Engine on Cloud Function Services," Cornell University Library, Nov. 26, 2019, 15 pages.

Sen et al., "Predictive Price-Performance Optimization for Serverless Query Processing", Cornell University Library, Dec. 16, 2021, 13 pages.

* cited by examiner

SYSTEMS AND METHODS FOR DYNAMIC QUERY OPTIMIZATION FOR DISTRIBUTED COMPUTING ENVIRONMENTS

TECHNICAL FIELD

The present disclosure generally relates to distributed computing systems, and more particularly to methods and systems for dynamically optimizing query execution in distributed computing environments

BACKGROUND

In distributed computing environments, efficient query execution is crucial for optimal system performance and resource utilization. Traditional query execution methods often face challenges in adapting to varying workloads and resource availability. One significant challenge is the static allocation of computational resources for query execution. This approach can lead to inefficiencies where queries are either under-provisioned, resulting in slow execution times, or over-provisioned, leading to wasted resources. Another issue is the lack of real-time adaptation to changing system conditions. As workloads fluctuate and resource availability shifts, static execution plans can become suboptimal, negatively impacting overall system performance. Furthermore, traditional systems often struggle with balancing workloads across multiple execution environments. This can result in some environments being overloaded while others remain underutilized, leading to inefficient resource allocation and potential bottlenecks. These challenges highlight the need for a more dynamic and adaptive approach to query execution in distributed computing environments.

SUMMARY

Accordingly, there is a need for methods and systems for dynamically optimizing query execution in distributed computing environments. According to some embodiments, the system described herein may analyze queries, and/or perform real-time resource allocation and adaptive execution environment selection, to enhance performance and efficiency.

In one aspect, a method is provided for dynamically optimizing query execution in a distributed computing environment. The method may include receiving a query for execution; analyzing the query to determine its complexity. The analysis may include generating an execution plan for the query, determining a total data volume to be processed, and/or identifying types and number of operations to be performed. The method may also include determining required computational resources based on the analysis. The determination may include estimating a number of processing units needed based on the total data volume, estimating additional processing units needed based on the types and number of operations, and/or calculating a total number of processing units required; selecting an execution environment for the query. The selection may include identifying available execution environments capable of providing the required computational resources, determining current workload status of the identified execution environments, and/or choosing an execution environment with the lowest current workload, based on real-time workload information. The method may also include, in accordance with a determination that (i) no suitable environment is available or (ii) all suitable environments exceed a predefined workload threshold, provisioning a new execution environment. The method may also include submitting the query to the selected or provisioned execution environment; monitoring the query execution until completion. The method may also include updating a query performance database with execution statistics.

In some embodiments, the method may further include load balancing across multiple execution environments to optimize overall system performance.

In some embodiments, the distributed computing environment may include a cloud-based data warehousing system with separated compute and storage architectures.

In some embodiments, provisioning a new execution environment may include either creating a new compute cluster or scaling an existing compute cluster according to specific scaling mechanisms of the distributed computing environment.

In some embodiments, the method may further include repeating receiving the query, analyzing the query, determining the required computational resources, selecting the execution environment, submitting the query, monitoring the query execution, and/or updating the query performance database, for multiple queries in parallel. Each query's execution environment selection may be based on real-time workload information.

In some embodiments, the parallel processing of multiple queries may include dynamically adjusting execution environment selections based on changing workload conditions.

In some embodiments, dynamically adjusting execution environment selections may be based on platform-specific concurrency limits of the distributed computing environment.

In some embodiments, the distributed computing environment may be a cloud-based data warehousing system.

In some embodiments, the execution environments may be virtual warehouses with varying computational capacities.

In some embodiments, the analysis of the query may include examining statistics from previous executions of similar queries.

In some embodiments, the required computational resources may be determined based on a mapping of data volume and operation complexity to processing units.

In some embodiments, the provisioning of a new execution environment may be performed automatically without user intervention.

In some embodiments, the automatic provisioning of a new execution environment may be performed in accordance with the specific scaling mechanisms of the distributed computing environment.

In some embodiments, the monitoring of query execution may include collecting performance metrics for future optimization.

In some embodiments, performance metrics collected during query execution monitoring may be specific to the distributed computing environment.

In some embodiments, analyzing the query to determine its complexity may further include considering data distribution strategies and sort keys specific to the distributed computing environment.

In some embodiments, determining required computational resources may further include considering the impact of data distribution strategies on resource requirements.

In some embodiments, selecting an execution environment for the query may further include considering platform-specific workload management features of the distributed computing environment.

In some embodiments, the execution environments may be one of: virtual warehouses, compute clusters, or parallel processing units with varying computational capacities.

In some embodiments, the method may further include load balancing across multiple execution environments to optimize overall system performance, which may take into account platform-specific workload management capabilities of the distributed computing environment.

In some embodiments, the distributed computing environment may be one of: a multi-cluster shared data architecture, a massively parallel processing (MPP) system, or a distributed SQL query engine.

In some embodiments, the required computational resources are determined based on a mapping of data volume and operation complexity to platform-specific compute units of the distributed computing environment.

In another aspect, a computer system for dynamically optimizing query execution in a distributed computing environment is provided. The computer system may include one or more processors and a memory. The memory stores one or more programs configured for execution by the one or more processors. The one or more programs may include instructions for performing any of the methods described herein.

BRIEF DESCRIPTION OF THE DRAWINGS

Like reference numerals refer to corresponding parts throughout the drawings.

DETAILED DESCRIPTION

Figure 1:
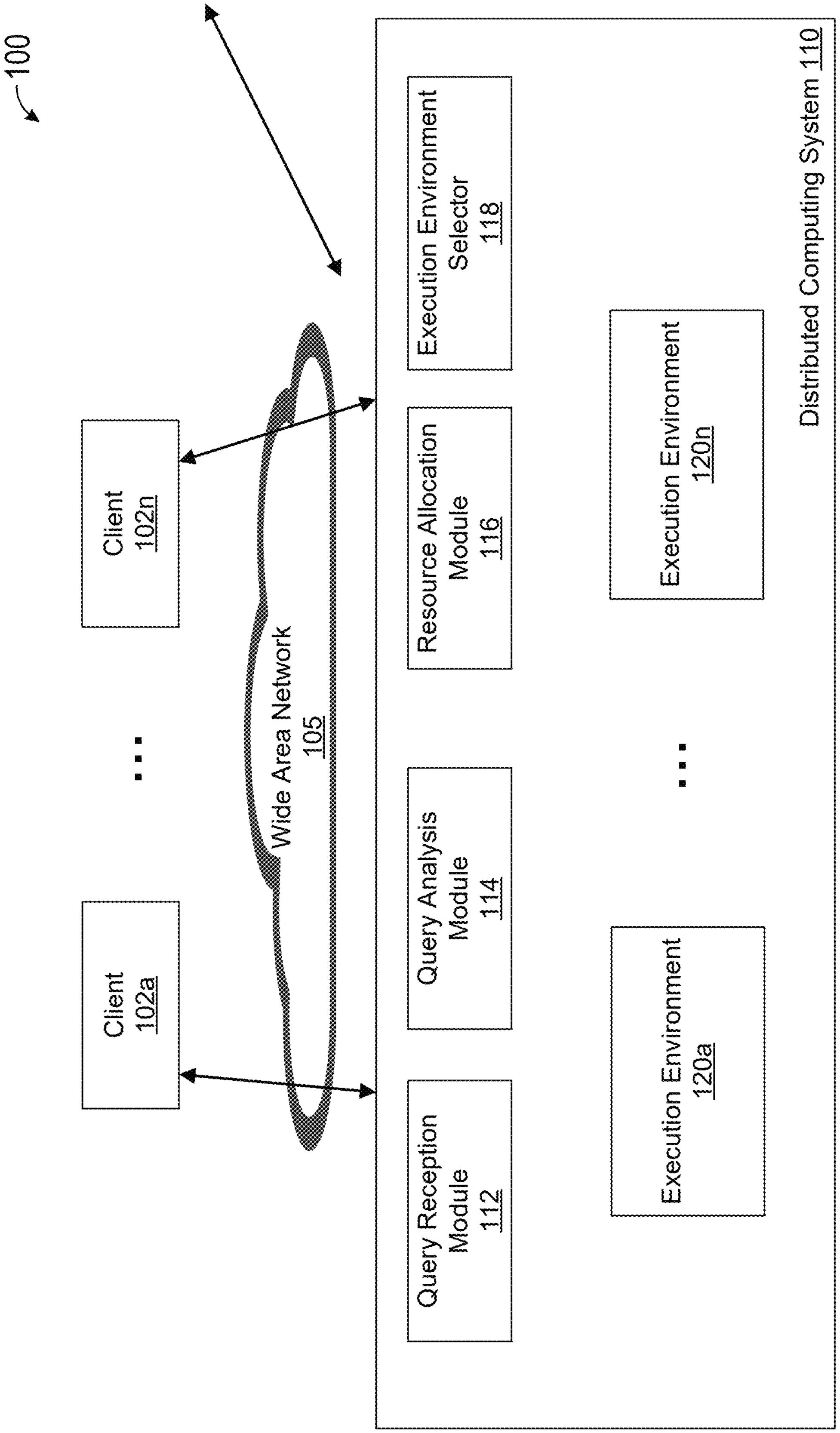
FIG. 1 shows an example distributed computing environment implementing a dynamic query execution optimization system, according to some embodiments.

Reference will now be made to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

The development of the techniques described herein is a response to the inefficiencies and challenges faced in traditional query execution methods in distributed computing environments. These traditional methods often employ static resource allocation and lack real-time adaptation capabilities, leading to suboptimal performance and resource utilization. The present disclosure may address these challenges by introducing a dynamic and adaptive approach to query execution optimization. This approach leverages intelligent query analysis, real-time resource allocation, and adaptive execution environment selection to enhance system performance and efficiency.

An aspect described herein is the ability to analyze incoming queries in real-time to determine their complexity. This analysis takes into account factors such as the total data volume to be processed and the types and number of operations to be performed. By generating an execution plan based on this analysis, the system can make informed decisions about resource requirements. Another aspect is the dynamic determination of required computational resources. Instead of, or in addition to, relying on static allocations, the system may estimate the number of processing units needed based on the query's characteristics. This may include considering both the data volume and the complexity of operations, ensuring that resources are allocated efficiently.

Also described herein is a method for selecting an appropriate execution environment. By identifying available environments capable of providing the required resources and considering their current workload status, the system can choose the optimal environment for each query. This real-time selection process helps balance workloads across the distributed system and prevents bottlenecks. Furthermore, the system described herein may incorporate a provisioning mechanism that automatically creates new execution environments when existing ones are unavailable or overloaded. This ensures that queries can always be executed, even during peak demand periods, without manual intervention. The system may also include continuous monitoring of query execution and performance data collection. This information may be used to update a query performance database, which can be leveraged for future optimizations and decision-making. By addressing these aspects, the present disclosure offers a comprehensive solution to the challenges of query execution in distributed computing environments. It provides a flexible, efficient, and scalable approach that can adapt to changing workloads and system conditions in real-time.

FIG. 1 shows an example distributed computing environment 100 implementing the dynamic query execution optimization system, according to some embodiments. The environment may include multiple client devices 102*a*-102*n* connected to a distributed computing system 110 via a network 105. The distributed computing system 110 may include a query reception module 112, a query analysis module 114, a resource allocation module 116, an execution environment selector 118, and/or multiple execution environments 120*a*-120*n*. After a client device, such as client device 102*a*, sends a query to the distributed computing system 110, the query may be received by the query reception module 112. The query analysis module 114 may then analyze the query to determine its complexity, generating an execution plan and identifying the data volume and operations involved. Based on this analysis, the resource allocation module 116 may determine the required computational resources. The execution environment selector 118 may then identify available execution environments capable of handling the query and/or select the most appropriate one based on current workload information. If no suitable environment is available or all environments are overloaded, the system can provision a new execution environment. The query may be submitted to the selected or newly provisioned environment for execution. During the execution process, the system 110 may monitor performance and/or collect statistics, which may be used to update a query performance database for future optimization.

Figure 2:
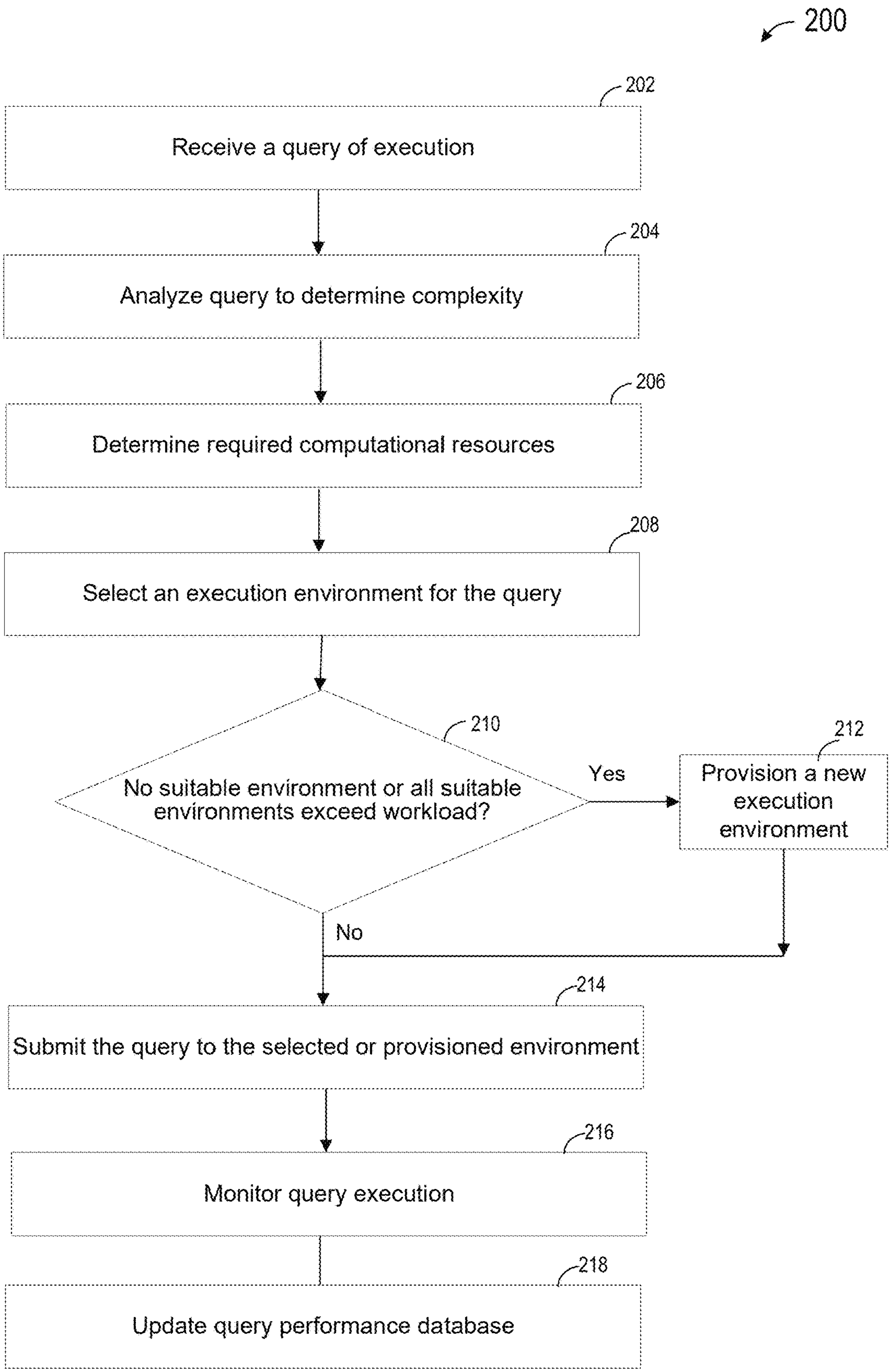
FIG. 2 shows a flowchart of an example method for dynamically optimizing query execution in a distributed computing environment, according to some embodiments.

FIG. 2 shows a flowchart of an example method 200 for dynamically optimizing query execution in a distributed computing environment, according to some embodiments. The method 200 may be performed by one or more computing devices (e.g., the distributed computing system 110 described in FIG. 1).

The method 200 may begin at step 202 with receiving a query for execution. At step 204, the query may be analyzed to determine its complexity. This analysis may include generating an execution plan for the query, determining the total data volume to be processed, and/or identifying the types and number of operations to be performed.

At step 206, the method determines the required computational resources based on the analysis. This involves estimating the number of processing units needed based on the total data volume and the types and number of operations, and then calculating the total number of processing units required.

Step 208 may include selecting an execution environment for the query. This selection process includes identifying available execution environments capable of providing the required computational resources, determining the current workload status of these environments, and choosing the environment with the lowest current workload based on real-time information.

Step 210 may determine if no suitable environment is available or all suitable environments exceed a predefined workload threshold. In step 212, the system may provision a new execution environment, if step 210 determines that either no suitable environment is available or all suitable environments exceed a predefined workload threshold.

At step 214, the query may be submitted to the selected or provisioned execution environment. The query execution may be then monitored (e.g., until completion) at step 216.

Finally, at step 218, a query performance database may be updated with execution statistics. This information can be used for future query optimization and resource allocation decisions. The query performance database may be structured as a table that captures key metrics for each query execution. This table may include fields for a query identifier, execution time, amount of data scanned, CPU time used, memory usage, disk I/O operations, warehouse size used, concurrency level at execution time, timestamp of execution, and/or the execution plan. This comprehensive data collection may allow for detailed analysis of query performance over time, enabling more informed decisions for future query optimization and resource allocation.

Figure 3:
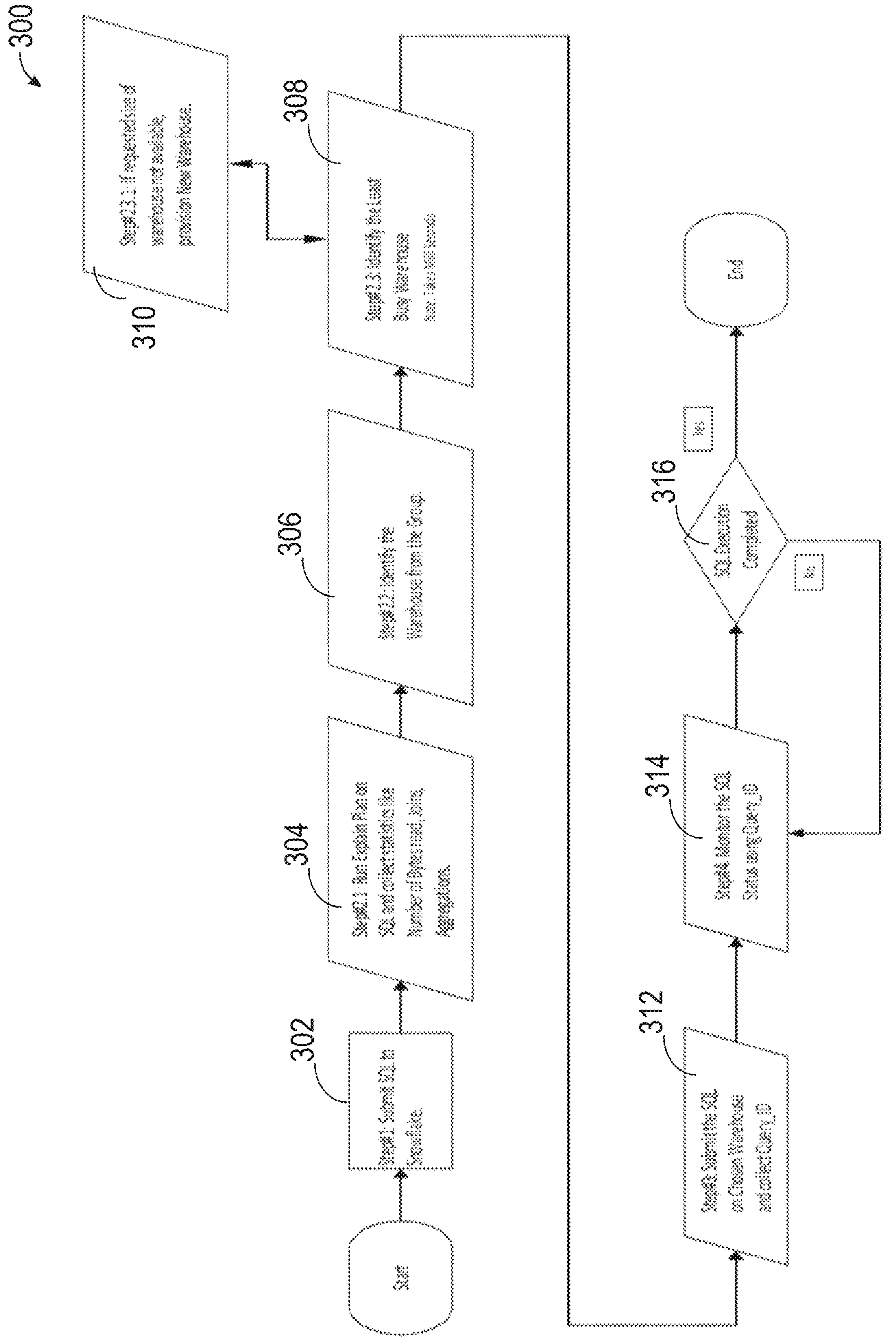
FIG. 3 shows a flowchart of an example method for dynamically optimizing SQL query execution in a Snowflake environment, according to some embodiments.

FIG. 3 shows a flowchart of an example method 300 for dynamically optimizing SQL query execution in a Snowflake environment, according to some embodiments. In step 302, SQL queries may be submitted to Snowflake using a Python framework (sometimes referred to as SnowLoadBalancer). This framework may act as an intermediary layer between a user's application and Snowflake, managing query submission and/or resource allocation.

In step 304, the system may generate an EXPLAIN plan for the SQL query and analyze the SQL query to determine a warehouse size based on analysis and complexity of SQL. The EXPLAIN plan is a detailed breakdown of how Snowflake will execute the query, including information about table scans, joins, and other operations. The system may use the EXPLAIN plan on SQL and/or use query statistics of same (or similar) SQLs previously run (e.g., using a query identifier). This historical data can help in making more accurate predictions about resource requirements. The system may collect the total number of bytes scanned and/or number of different operator types (e.g., Aggregator, Joins, Filters) used. Each 250 micro partitions (1 micro partition may handle 16 MB compressed data) may, for example, correspond to one core (e.g., considering node is equivalent to 8 cores, 200 GB disk or 1 XS Warehouse). For each operator type, two additional cores may be used. For example, for four different operators, 4 times 2, equal to 8 cores may be used. To illustrate, suppose a query needs to scan 4000 MB of data, that would be equivalent to 250 micro partitions (4000 MB/16 MB per partition), corresponding to one core. Further suppose this query also uses three different operator types (e.g., a JOIN, an AGGREGATE, and a FILTER), it would require an additional 6 cores (3 operators times 2 cores per operator). In total, this query may require 7 cores.

Based on Snowflake processing and various types of loads, the system may, in step 306, select a warehouse size as follows:

| Calculated Cores > | Calculated Cores <= | Warehouse Size | Number of Cores |
|---|---|---|---|
| >0 | <=4 | XS | 8 |
| >4 | <=12 | S | 16 |
| >12 | <=28 | M | 32 |
| >28 | <=60 | L | 64 |
| >60 | <=91 | L | 64 |
| >91 | <=124 | XL | 128 |
| >124 | <=186 | XL | 128 |
| >186 | <=248 | XL | 128 |
| >248 | <=310 | XL | 128 |
| >310 | <=372 | 2XL | 256 |
| >372 | <=434 | 2XL | 256 |
| >434 | <=496 | 2XL | 256 |
| >496 | <=558 | 2XL | 256 |
| >558 | <=620 | 3XL | 512 |
| >620 | <=682 | 3XL | 512 |
| >682 | <=744 | 3XL | 512 |
| >744 | <=806 | 3XL | 512 |
| >806 | <=868 | 3XL | 512 |
| >868 | <=930 | 3XL | 512 |
| >930 | <=992 | 3XL | 512 |
| >992 | <=1054 | 3XL | 512 |

This table may provide a mapping between the calculated core requirements and the appropriate Snowflake warehouse size. The table may help ensure that queries are allocated sufficient resources without over-provisioning.

For an SQL, suppose there are 16,000 micro partitions. Suppose operator types are CREATE TABLE, Result, CreateTableAsSelect, Aggregate, Join, UnionAll, Generator, JoinFilter, SemiJoin, TryDeduplicate, TableScan, and Filter. Calculated cores may be (16,000/250)+(12 times 2)=64+24=88 (L Warehouse). For this example, 16,000 micro partitions/250 micro partitions per core=64 cores for data processing. 12 operator types times 2 cores per operator results in 24 cores for operators. So total cores needed may be 64+24, equal to 88 cores. According to the example table shown above, 88 cores falls in the range for an L warehouse (between 60 and 91 cores).

In step 308, for a selected warehouse size, the system may choose the least busy warehouse among the warehouses of same size to avoid unnecessary queue time. The process may include: fetching the current status of the warehouses, filtering the warehouses which are matching with chosen warehouse size, collecting the information on current usage on these warehouses (e.g., number of queries running, number of queries in queue), and/or choosing the warehouse with least (number of queries in running) value.

For example, suppose there are three L-sized warehouses available: warehouse L1: 5 queries running, 2 in queue; warehouse L2: 3 queries running, 0 in queue; and warehouse L3: 4 queries running, 1 in queue. The system may choose warehouse L2 as it has the least number of running queries and no queue.

In step 310, if selected warehouse size is not available, the system may provision a new warehouse (e.g., based on the warehouse size selected) and select that new warehouse. The process may, for example, include fetching the current status of warehouses, filtering the warehouses which are matching with the chosen warehouse size, and/or collecting the information on current usage on these warehouses (e.g., number of queries running, number of queries in queue). If all the warehouses in select size of warehouse have queries in queue, then the system may create a new warehouse and submit SQL on the new warehouse. This dynamic provisioning may help ensure that queries are not delayed due to lack of resources. For instance, if all L-sized warehouses are at capacity or have queries in queue, the system may automatically create a new L-sized warehouse to handle the incoming query.

In step 312, the system may submit the SQL on the chosen warehouse and collect query_ID. This query_ID may be a unique identifier assigned by Snowflake to track the execution of the query.

In steps 314 and 316, the system may monitor the query_ID until success/failure. This continuous monitoring allows for real-time tracking of query progress and enables quick identification of any issues that may arise during execution.

The system may handle parallelism by dividing the SQLs into multiple jobs, which runs Python Process of SnowLoadBalancer), each jobs may run multiple SQLs. The jobs may be triggered at the same time in parallel. In each job, the above checks may happen for each SQL before it gets submitted to a snowflake warehouse. As the jobs are running in parallel, for one or more jobs, the latest information on warehouse may be collected from Snowflake for better load balancing across warehouses. This may in turn help in spreading the load across warehouses where high, medium, or less complex SQLs may be distributed across all the warehouses. For example, if there are 100 SQL queries to be executed. The system may divide these into 10 jobs, each handling 10 queries. Each job runs independently, performing the warehouse selection and query submission process for its assigned queries. As Job 1 is selecting a warehouse for its first query, Job 2 may be doing the same for its third query, and so on. This parallel processing ensures that warehouse utilization information is always up-to-date, leading to optimal load distribution.

The method 300 may run either on Snowflake metadata service layer or in a Python script in the system. The method 300 may take milli-seconds to few seconds (e.g., less than 5 seconds) to complete, according to some embodiments. This rapid execution may help ensure that the optimization process incurs minimal overhead to the overall query execution.

Example Method for Dynamically Optimizing Query Execution

In one aspect, a method is provided for dynamically optimizing query execution in a distributed computing environment. The distributed computing environment may include a cloud-based data warehousing system with separated compute and storage architectures (e.g., Amazon Redshift with RA3 instances using S3 for storage). In traditional data warehousing systems, compute and storage resources are tightly coupled. Separated compute and storage architectures may decouple these resources, offering several benefits. This approach, for example, allows for independent scaling of compute and storage based on workload demands, and may lead to improved cost-efficiency as users only pay for the compute resources they use, while storage can be optimized separately. Separated compute and storage architectures enables concurrent access, where multiple compute clusters can access the same data simultaneously, and facilitates data sharing, allowing different compute environments to access shared datasets without data movement. For example, in a system like Snowflake, data is stored in cloud object storage, while virtual warehouses (compute clusters) are spun up on-demand to process queries. Multiple warehouses can access the same data concurrently, and compute resources can be easily scaled up or down without affecting data storage. This architecture allows for more flexible and efficient query optimization strategies, as compute resources can be dynamically allocated based on query complexity and data volume without being constrained by storage considerations.

As explained above in reference to FIG. 1, the distributed computing system 110 may perform this method. The query reception module 112 may receive a query for execution (e.g., SQL query: "SELECT SUM(sales) FROM transactions WHERE date >='2023-01-01'"). The query analysis module 114 may then analyze the query to determine its complexity. This analysis may include generating an execution plan for the query (e.g., query plan showing table scan, filter, and aggregation operations), determining a total data volume to be processed in the query (e.g., 500 GB of transaction data), and/or identifying types and number of operations to be performed (e.g., 1 table scan, 1 filter, 1 aggregation).

The query plan showing, for example, table scan, filter, and aggregation operations, may correspond to a sequence of steps that a database management system would take to execute the given SQL query efficiently. A table scan is typically the first step in the query execution. The database engine may read all rows from a transactions table sequentially. During this process, the database engine may examine every record in the table, which can be time-consuming for large datasets. This operation is necessary because the query may need to consider all transactions to calculate the total sales, for the example above. After the table scan, a filter operation may be applied. In this case, the filter corresponds to the WHERE clause in the SQL query: "WHERE date >='2023-01-01'." This step narrows down the dataset by only keeping the records that meet the specified condition. The filter eliminates all transactions that occurred before Jan. 1, 2023, for example, significantly reducing the amount of data for subsequent operations. A final step may be the aggregation operation, which corresponds to the SUM function in the SQL query. This operation may calculate the total sales by adding up the 'sales' values from all the records that passed through the filter. The aggregation operation is an example of a summary statistic that condenses multiple rows of data into a single result. These operations work together to efficiently process the data and produce the desired result. The query plan helps the database optimizer understand how to best execute the query, potentially using indexes or parallel processing to improve performance, especially when dealing with large volumes of data like the 500 GB mentioned in the example.

The resource allocation module 116 may then determine required computational resources based on the analysis. This determination may include estimating a number of processing units needed based on the total data volume (e.g., 20 cores for 500 GB), estimating additional processing units needed based on the types and number of operations (e.g., 2 cores for aggregation), and/or calculating a total number of processing units required (e.g., 22 cores total).

Next, the execution environment selector 118 may select an execution environment for the query. This selection may include identifying available execution environments capable of providing the required computational resources (e.g., warehouses of size medium and large), determining current workload status of the identified execution environments (e.g., medium: 70% utilized, large: 40% utilized), and/or choosing an execution environment with the lowest current workload, based on real-time workload information (e.g., selecting the large warehouse).

As described in step 210 of FIG. 2, if no suitable environment is available or all suitable environments exceed a predefined workload threshold, the system may provision a new execution environment (e.g., creating a new Large warehouse if all existing ones are >80% utilized). For instance, a predefined workload threshold could be set at 80% utilization. If all suitable warehouses exceed this threshold, a new warehouse may be provisioned. No suitable execution environment may be available due to several factors. For example, the factors may include high utilization of existing environments, insufficient computational resources, reaching platform-specific concurrency limits, workload management constraints, misalignment with data distribution strategies, peak demand periods, and/or specialized resource requirements. When all existing environments are operating at or near capacity (e.g., above 80% utilization), lack the necessary resources for a query's complexity and data volume, and/or have reached their query concurrency limits, the environments may become unsuitable. Additionally, workload management features, poor alignment with data distribution, high system load during peak times, or queries requiring specific configurations can also result in a lack of suitable environments. In such cases, the system may automatically provision a new execution environment.

The query may then be submitted to the selected or provisioned execution environment (e.g., sending the SQL to the chosen Large warehouse). As outlined in step 216 of FIG. 2, the system may monitor the query execution until completion (e.g., tracking progress, runtime, and resource usage). Finally, as described in step 218, the system may update a query performance database with execution statistics (e.g., storing query runtime, bytes processed, and CPU usage).

In some embodiments, the system may perform load balancing across multiple execution environments to optimize overall system performance (e.g., distributing queries across three medium warehouses instead of using one large warehouse). Load balancing across multiple execution environments can be achieved using various algorithms. These may include, for example, round robin, which may distribute queries sequentially across available environments; least connections, which may send queries to the environment with the fewest active connections; weighted round robin, which may assign weights to environments based on their capacity and distributes queries accordingly; and dynamic least connections, which may be similar to least connections but may also consider the current load and capacity of each environment. For instance, a weighted round robin approach may be used to ensure that environments with higher capacity receive proportionally more queries, for efficient utilization of resources.

When provisioning a new execution environment, the system may either create a new compute cluster or scale an existing compute cluster according to specific scaling mechanisms of the distributed computing environment (e.g., in Redshift, adding nodes to an existing cluster instead of creating a new one).

As illustrated in the parallel processing example described above, the system may handle multiple queries concurrently. The system may repeat the process of receiving the query, analyzing the query, determining the required computational resources, selecting the execution environment, submitting the query, monitoring the query execution, and/or updating the query performance database, for multiple queries in parallel. Each query's execution environment selection may be based on real-time workload information (e.g., processing 10 concurrent queries, each potentially using different warehouses based on current load).

The parallel processing of multiple queries may include dynamically adjusting execution environment selections based on changing workload conditions (e.g., redirecting a new query to a Medium warehouse after a long-running query on a Large warehouse completes).

As explained above, the system may dynamically adjust execution environment selections based on platform-specific concurrency limits of the distributed computing environment. For example, in Snowflake, redirecting queries to less busy warehouses when approaching the query concurrency limit (e.g., 8 queries) of a Standard edition virtual warehouse. In Amazon Redshift, for example, the system may consider the maximum concurrent queries limit, which may vary based on the cluster node type and size. The distributed computing environment may be a cloud-based data warehousing system (e.g., Snowflake, Amazon Redshift, or Azure Synapse Analytics). The execution environments may be virtual warehouses with varying computational capacities (e.g., Snowflake's X-Small to 4×-Large warehouses), as described above in reference to the example warehouse size selection table.

When analyzing the query, the query analysis module 114 may examine statistics from previous executions of similar queries (e.g., checking average runtime and resource usage of similar aggregation queries on the transactions table).

The resource allocation module 116 may determine the required computational resources based on a mapping of data volume and operation complexity to processing units (e.g., 1 core per 25 GB of data, plus 2 cores for each join operation).

The system may perform the provisioning of a new execution environment automatically without user intervention (e.g., system automatically creates a new Large warehouse when needed, without requiring admin approval). This automatic provisioning may be performed in accordance with the specific scaling mechanisms of the distributed computing environment (e.g., in Azure Synapse, automatically scaling compute resources based on Data Warehouse Units (DWUs)).

When monitoring query execution, the system may collect performance metrics for future optimization (e.g., recording query runtime, CPU usage, memory usage, and I/O operations for each executed query). These performance metrics may be specific to the distributed computing environment (e.g., in Redshift, collecting queue time and disk-based queries metrics).

When analyzing the query to determine its complexity, the query analysis module 114 may consider data distribution strategies and sort keys specific to the distributed computing environment (e.g., in Redshift, checking if the query benefits from the current distribution key of the transactions table). For instance, in Amazon Redshift, the system may consider the distribution style (e.g., EVEN, KEY, or ALL) and sort key of tables when analyzing query complexity.

The resource allocation module 116, when determining required computational resources, may consider the impact of data distribution strategies on resource requirements (e.g., estimating lower resource needs for a query that aligns well with the current data distribution).

The execution environment selector 118, when selecting an execution environment for the query, may consider platform-specific workload management features of the distributed computing environment (e.g., in Azure Synapse, considering the impact of workload management groups on query prioritization).

The execution environments may be one of: virtual warehouses, compute clusters, or parallel processing units with varying computational capacities (e.g., Snowflake virtual warehouses, Redshift clusters, or Azure Synapse SQL pools).

The system's load balancing across multiple execution environments to optimize overall system performance may take into account platform-specific workload management capabilities of the distributed computing environment (e.g., in BigQuery, distributing queries across multiple reservations while considering slot commitments). In Snowflake, for example, this may include considering resource monitors and warehouse sizing automation. In Azure Synapse, for example, this may include evaluating workload importance and isolation settings.

The distributed computing environment may be one of: a multi-cluster shared data architecture, a massively parallel processing (MPP) system, or a distributed SQL query engine (e.g., Snowflake as a multi-cluster shared data architecture, Redshift as an MPP system, or Presto as a distributed SQL query engine). In a multi-cluster shared data architecture like Snowflake, multiple compute clusters can simultaneously access the same data storage, allowing for efficient scaling and workload isolation.

The resource allocation module 116 may determine the required computational resources based on a mapping of data volume and operation complexity to platform-specific compute units of the distributed computing environment (e.g., in Azure Synapse, mapping query complexity to required Data Warehouse Units (DWUs)).

Figure 4:
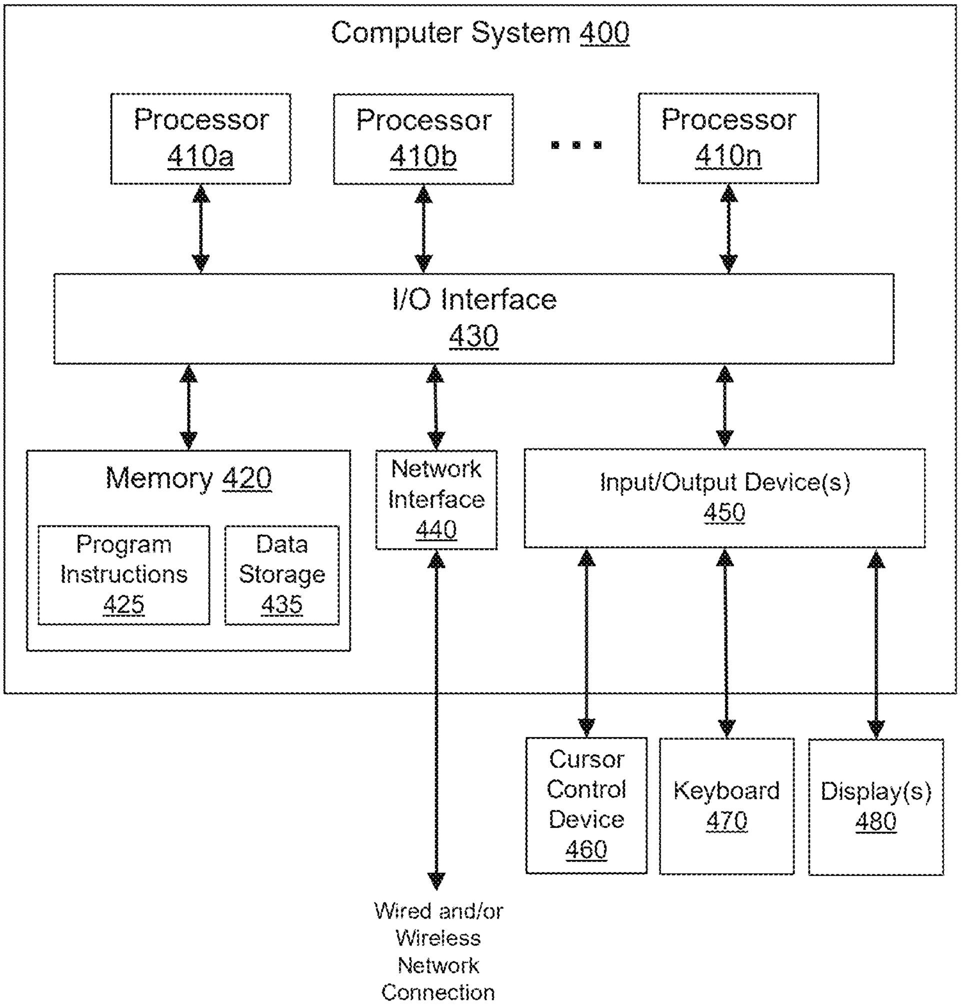
FIG. 4 illustrates an example of a computer system 400 on which embodiments described herein may be executed.

FIG. 4 illustrates an example of a computer system 400 on which embodiments described herein may be executed. The computer system 400 includes a processor 410, memory 420, storage 430, and network interface 440. The memory 420 stores program instructions 422 which, when executed by the processor 410, perform the methods described in this disclosure.

Embodiments described herein may be executed on one or more computer systems, which may interact with various other devices. One such computer system is illustrated by FIG. 4. In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 400 includes one or more processors 410 coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. Display(s) 480 may include standard computer monitor(s) and/or other display systems, technologies or devices. In at least some implementations, the input/output devices 450 may also include a touch- or multi-touch enabled device such as a pad or tablet via which a user enters input via a stylus-type device and/or one or more digits. In some embodiments, it is contemplated that embodiments may be implemented using a single instance of computer system 400, while in other embodiments multiple such systems, or multiple nodes making up computer system 400, may be configured to host different portions or instances of embodiments. For example, in one embodiment some elements may be implemented via one or more nodes of computer system 700 that are distinct from those nodes implementing other elements.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments, processors 410 may be general-purpose or embedded processors implementing any of a variety of instruction set architectures (ISAs), such as the x86, PowerPC, SPARC, or MIPS ISAs, or any other suitable ISA. In multiprocessor systems, each of processors 410 may commonly, but not necessarily, implement the same ISA.

In some embodiments, at least one processor 410 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s).

System memory 420 may be configured to store program instructions and/or data accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for scaling computing clusters in distributed systems as described herein are shown stored within system memory 420 as program instructions 425 and data storage 435, respectively. In other embodiments, program instructions and/or data may be received, sent or stored upon different types of computer-accessible media or on similar media separate from system memory 420 or computer system 400. Generally speaking, a computer-accessible medium may include storage media or memory media such as magnetic or optical media, e.g., disk or CD/DVD-ROM coupled to computer system 400 via I/O interface 430. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 440.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments some or all of the functionality of I/O interface 430, such as an interface to system memory 420, may be incorporated directly into processor 410.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or retrieving data by one or more computer system 400. Multiple input/output devices 450 may be present in computer system 400 or may be distributed on various nodes of computer system 400. In some embodiments, similar input/output devices may be separate from computer system 400 and may interact with one or more nodes of computer system 700 through a wired or wireless connection, such as over network interface 440.

As shown in FIG. 4, memory 420 may include program instructions 425, configured to dynamically optimize query execution in a distributed computing environment as described herein, and data storage 435, comprising various data accessible by program instructions 425. In one embodiment, program instructions 425 may include software elements of embodiments as described herein and as illustrated in the Figures. Data storage 435 may include data that may be used in embodiments. In other embodiments, other or different software elements and data may be included.

Those skilled in the art will appreciate that computer system 400 is merely illustrative and is not intended to limit the scope of the stereo drawing techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

The dynamic query execution optimization system described in this disclosure offers several advantages over traditional approaches. By analyzing queries in real-time and dynamically allocating resources, it can significantly improve query performance and system efficiency. The ability to provision new execution environments on-demand ensures scalability and prevents bottlenecks during peak usage periods. Moreover, the continuous monitoring and collection of performance data allow for ongoing optimization of the system. This adaptive approach ensures that the system can evolve and improve over time, adjusting to changing workloads and query patterns.

While the present disclosure has been described with reference to various implementations, it will be understood that these implementations are illustrative and that the scope of the disclosure is not limited to them. Many variations, modifications, additions, and improvements are possible. More generally, embodiments in accordance with the present disclosure have been described in the context of particular implementations. Functionality may be separated or combined in procedures differently in various embodiments of the disclosure or described with different terminology. These and other variations, modifications, additions, and improvements may fall within the scope of the disclosure as defined in the claims that follow.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for dynamically optimizing query execution in a distributed computing environment, comprising, at a computing device:

receiving a query for execution at a distributed computing environment with computing constraints;

analyzing the query to determine complexity of the query, wherein the analysis comprises:

generating an execution plan for the query;

determining a total data volume to be processed; and identifying types and number of operations to be performed;

determining required computational resources based on the analysis and on a mapping of data volume and operation complexity to platform-specific compute units of the distributed computing environment, wherein the determination comprises:

estimating a first number of processing units needed based on the total data volume;

estimating a second number of processing units needed based on the types and number of operations; and calculating a total number of processing units required by adding the first number of processing units to the second number of processing units;

selecting an execution environment for the query, wherein the selection comprises:

identifying existing execution environments capable of providing the required computational resources;

upon a determination that existing execution environments capable of providing the required computational resources do not exist, provisioning a new execution environment and designating the new execution environment as a chosen execution environment;

upon a determination that existing execution environments capable of providing the required computational resources do exist:

determining current workload status of the existing execution environments based on real time workload information; and determining whether any of the existing execution environments has a current workload below a predefined workload threshold;

upon a determination that at least one of the existing execution environments has a current workload below the predefined workload threshold, choosing one of the existing execution environments, having the lowest current workload, as the chosen execution environment; and upon a determination that none of the existing execution environments has a current workload below the predefined workload threshold, provisioning a new execution environment and designating the new execution environment as the chosen execution environment;

submitting the query to the chosen execution environment;

monitoring the query execution until completion;

updating a query performance database with execution statistics; and repeating receiving the query, analyzing the query, determining the required computational resources, selecting the execution environment, submitting the query, monitoring the query execution, and updating the query performance database, for multiple queries in parallel, wherein each query's execution environment selection is based on real-time workload information and wherein the parallel processing of multiple queries includes dynamically adjusting execution environment selections based on changing workload conditions.

2. The method of claim 1, further comprising load balancing across multiple execution environments to optimize overall system performance.

3. The method of claim 1, wherein the distributed computing environment comprises a cloud-based data warehousing system with separated compute and storage architectures.

4. The method of claim 1, wherein provisioning a new execution environment comprises either creating a new compute cluster or scaling an existing compute cluster according to specific scaling mechanisms of the distributed computing environment.

5. The method of claim 1, wherein dynamically adjusting execution environment selections is based on platform-specific concurrency limits of the distributed computing environment.

6. The method of claim 1, wherein the execution environments are virtual warehouses with varying computational capacities.

7. The method of claim 1, wherein the analysis of the query includes examining statistics from previous executions of similar queries.

8. The method of claim 1, wherein the required computational resources are determined based on a mapping of data volume and operation complexity to processing units.

9. The method of claim 1, wherein the provisioning of a new execution environment is performed automatically without user intervention and the automatic provisioning of a new execution environment is performed in accordance with the specific scaling mechanisms of the distributed computing environment.

10. The method of claim 6, wherein performance metrics collected during query execution monitoring are specific to the distributed computing environment.

11. The method of claim 1, wherein analyzing the query further comprises considering data distribution strategies and sort keys specific to the distributed computing environment.

12. The method of claim 1, wherein determining required computational resources further comprises considering the impact of data distribution strategies on resource requirements.

13. The method of claim 1, wherein selecting an execution environment for the query further comprises considering platform-specific workload management features of the distributed computing environment.

14. The method of claim 1, wherein the execution environments are one of: virtual warehouses, compute clusters, or parallel processing units with varying computational capacities.

15. The method of claim 1, further comprising load balancing across multiple execution environments to optimize overall system performance, taking into account platform-specific workload management capabilities of the distributed computing environment.

16. The method of claim 1, wherein the distributed computing environment is one of: a multi-cluster shared data architecture, a massively parallel processing (MPP) system, or a distributed SQL query engine.

17. A computer system for facilitating a data exchange, comprising:

one or more processors; and a memory, wherein the memory stores one or more programs configured for execution by the one or more processors, and the one or more programs comprise instructions for:

receiving a query for execution at a distributed computing environment with computing constraints;

analyzing the query to determine complexity of the query, wherein the analysis comprises:

generating an execution plan for the query;

determining a total data volume to be processed; and identifying types and number of operations to be performed;

determining required computational resources based on the analysis and on a mapping of data volume and operation complexity to platform-specific compute units of the distributed computing environment, wherein the determination comprises:

estimating a first number of processing units needed based on the total data volume;

estimating a second number of processing units needed based on the types and number of operations; and calculating a total number of processing units required by adding the first number of processing units to the second number of processing units;

selecting an execution environment for the query, wherein the selection comprises:

identifying existing execution environments capable of providing the required computational resources;

upon a determination that existing execution environments capable of providing the required computational resources do not exist, provisioning a new execution environment and designating the new execution environment as a chosen execution environment;

upon a determination that existing execution environments capable of providing the required computational resources do exist:

determining current workload status of the existing execution environments based on real time workload information; and determining whether any of the existing execution environments has a current workload below a predefined workload threshold;

upon a determination that at least one of the existing execution environments has a current workload below the predefined workload threshold, choosing one of the existing execution environments, having the lowest current workload, as the chosen execution environment; and upon a determination that none of the existing execution environments has a current workload below the predefined workload threshold, provisioning a new execution environment and designating the new execution environment as the chosen execution environment;

submitting the query to the chosen execution environment;

monitoring the query execution until completion;

updating a query performance database with execution statistics; and repeating receiving the query, analyzing the query, determining the required computational resources, selecting the execution environment, submitting the query, monitoring the query execution, and updating the query performance database, for multiple queries in parallel, wherein each query's execution environment selection is based on real-time workload information and wherein the parallel processing of multiple queries includes dynamically adjusting execution environment selections based on changing workload conditions.

* * * * *